United States Patent
Al-Maadeed et al.

(10) Patent No.: US 12,505,657 B2
(45) Date of Patent: Dec. 23, 2025

(54) ASSISTIVE SYSTEM FOR PEOPLE WITH VISUAL IMPAIRMENTS

(71) Applicant: QATAR UNIVERSITY, Doha (QA)

(72) Inventors: Somaya S A Ali Al-Maadeed, Doha (QA); Jayakanth Kunhoth, Doha (QA); Nandhini Subramanian, Doha (QA); Mohammed Zied Chaari, Doha (QA)

(73) Assignee: QATAR UNIVERSITY, Doha (QA)

( * ) Notice: Subject to any disclaimer, the term of this patent is extended or adjusted under 35 U.S.C. 154(b) by 669 days.

(21) Appl. No.: 17/582,714

(22) Filed: Jan. 24, 2022

(65) Prior Publication Data
US 2022/0237904 A1    Jul. 28, 2022

Related U.S. Application Data

(60) Provisional application No. 63/141,346, filed on Jan. 25, 2021.

(51) Int. Cl.
*G06V 10/82* (2022.01)
*G01C 21/00* (2006.01)
(Continued)

(52) U.S. Cl.
CPC ........... *G06V 10/82* (2022.01); *G01C 21/005* (2013.01); *G06T 7/73* (2017.01); *G06V 20/63* (2022.01); *H04N 7/183* (2013.01); *G10L 15/22* (2013.01)

(58) Field of Classification Search
CPC ...... G01C 21/005; G01C 21/206; G06T 7/73; G06V 10/80; G06V 10/82; G06V 20/36; G06V 20/63; H04N 7/183; G10L 15/22
See application file for complete search history.

(56) References Cited

U.S. PATENT DOCUMENTS 9,578,307 B2    2/2017  Moore et al.
11,026,048 B1*  6/2021  Ebner .................. H04W 4/026
(Continued)

FOREIGN PATENT DOCUMENTS

| ES | 2447641 A2 | 3/2014 |
| RU | 175011 U1 | 3/2017 |
| WO | 2017/156021 A1 | 9/2017 |

OTHER PUBLICATIONS

Y. Lee et al., "RGB-D camera based wearable navigation system for the visually impaired", Computer Vision and Image Understanding 149 (2016) 3-20, www.elsevier.com/locate/cviu, Institute for Robotics and Intelligent Systems, University of Southern California, Los Angeles, CA, http://dx.doi.org/10.1016/j-cviu.2016.03.019, 18 pages.
(Continued)

*Primary Examiner* — Michael J Vanchy, Jr.
(74) *Attorney, Agent, or Firm* — SQUIRE PATTON BOGGS (US) LLP

(57) ABSTRACT

Systems, methods, apparatuses, and computer program products for assisting people with visual impairments. A method for operating a mobile assistive device may be provided. The method may include capturing an image of a real-time scene of an environment. The method may also include sending the image to a single-board computer. The method may further include processing the image. In addition, the method may include providing navigation assistance to a user based on the processed image.

15 Claims, 9 Drawing Sheets

(51) Int. Cl.
  *G06T 7/73* (2017.01)
  *G06V 20/62* (2022.01)
  *H04N 7/18* (2006.01)
  *G10L 15/22* (2006.01)

(56) References Cited

U.S. PATENT DOCUMENTS

| | | | | |
|---|---|---|---|---|
| 2008/0309913 | A1* | 12/2008 | Fallon | A61H 3/061 250/332 |
| 2013/0250078 | A1 | 9/2013 | Levy | |
| 2015/0002808 | A1* | 1/2015 | Rizzo, III | A61N 1/36046 351/158 |
| 2018/0189567 | A1* | 7/2018 | Maheriya | G09B 21/007 |
| 2019/0130896 | A1* | 5/2019 | Zhou | G06N 3/084 |
| 2020/0026951 | A1* | 1/2020 | Chowdhury | G06T 3/40 |
| 2020/0160748 | A1* | 5/2020 | Hans | G09B 21/008 |
| 2022/0051402 | A1* | 2/2022 | Dikici | G06T 7/0012 |
| 2022/0084433 | A1* | 3/2022 | Wilson | G10L 15/22 |

OTHER PUBLICATIONS

J. Bai et al., "A Could and Vision-based Navigation System Used for Blind People", http://dx.doi.org/10.1145/3080845.3080867, 6 pages, 2017 Association for Computing Machinery.

F. Bashiri et al., "Object Detection to Assist Visually Impaired People: A Deep Neural Network Adventure", Springer Nature Switzerland AG 2018, G. Bebis et al. (Eds.), ISVC 2018, LNCS 11241, pp. 500-510, 2018, https://doi.org/10.1007/978-3-030-03801-4_44.

Y. Tian et al., "Computer Vision-Based Door Detection for Accessibility of Unfamiliar Environments to Blind Persons", K. Miesenberger et al. (Eds.): ICCHP 2010, Part II, LNCS 6180, pp. 263-270, 2010, Springer-Verlag Berlin Heidelberg 2010.

Bing Li et al., "Vision-Based Mobile Indoor Assistive Navigation Aid for Blind People", IEEE Transactions on Mobile Computing, vol. 18, No. 3, Mar. 2019, http://www.ieee.org/publications_standards/publications/rights/index.html, 13 pages.

A. Murillo et al., "Wearable Omnidirectional Vision System for Personal Localization and Guidance", DIIS—Instituto de Investigacion en Aragon, Universidad de Zaragoza, Spain, 7 pages.

* cited by examiner

ASSISTIVE SYSTEM FOR PEOPLE WITH VISUAL IMPAIRMENTS

CROSS-REFERENCE TO RELATED APPLICATIONS

This application claims priority from U.S. provisional patent application No. 63/141,346 filed on Jan. 25, 2021. The contents of this earlier filed application are hereby incorporated by reference in their entirety

FIELD

Some embodiments may generally relate to assistive systems. More specifically, certain embodiments may relate to apparatuses, systems, and/or methods for assisting people with visual impairments.

BACKGROUND

Assistive technologies are often implemented in various domains where people require a specific type of assistance. For example, people with visual impairments (VI), such as people with low vision and blind people, can depend on mobile assistive systems for various applications such as indoor navigation, outdoor navigation, e-learning, and object recognition, etc. Mobile systems that are designed for assisting people with visual impairment can improve their job life as well as personal life. In the last decade, computer vision techniques have been extensively explored for the development of assistive systems for people with VI. Thus, there is a need for the deployment of computer vision, machine learning, and deep learning algorithms to enable mobile devices and/or systems to provide reliable assistance for people with VI.

SUMMARY

Certain embodiments may be directed to a method for operating a mobile assistive device. The method may include capturing an image of a real-time scene of an environment. The method may also include sending the image to a single-board computer. The method may further include processing the image. In addition, the method may include providing navigation assistance to a user based on the processed image. According to certain embodiments, the processing of the image may include at least one of recognizing a location of the user in the environment, recognizing or detecting an object in the environment, detecting static or dynamic obstacles in the environment, and performing an end-to-end text recognition of the image.

Other embodiments may be directed to a mobile assistive device. The mobile assistive device may include at least one processor, and at least one memory including computer program code. The at least one memory and the computer program code may be configured to, with the at least one processor, cause the mobile assistive device at least to capture an image of a real-time scene of an environment. The mobile assistive device may also be caused to send the image to a single-board computer. The mobile assistive device may further be caused to process the image. In addition, the mobile assistive device may be caused to provide navigation assistance to a user based on the processed image. According to certain embodiments, processing the image may include at least one of recognizing a location of the user in the environment, recognizing or detecting an object in the environment, detecting static or dynamic obstacles in the environment, and performing an end-to-end text recognition of the image.

Other embodiments may be directed to a computer program, embodied on a non-transitory computer readable medium. The computer program, when executed by a processor, may cause the processor to capture an image of a real-time scene of an environment. The processor may also be caused to send the image to a single-board computer. The processor may further be caused to process the image. In addition, the processor may be caused to provide navigation assistance to a user based on the processed image. According to certain embodiments, processing the image may include at least one of recognizing a location of the user in the environment, recognizing or detecting an object in the environment, detecting static or dynamic obstacles in the environment, and performing an end-to-end text recognition of the image.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION

It will be readily understood that the components of certain example embodiments, as generally described and illustrated in the figures herein, may be arranged and designed in a wide variety of different configurations. The following is a detailed description of some embodiments for assisting people with visual impairments.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Figure 1A:
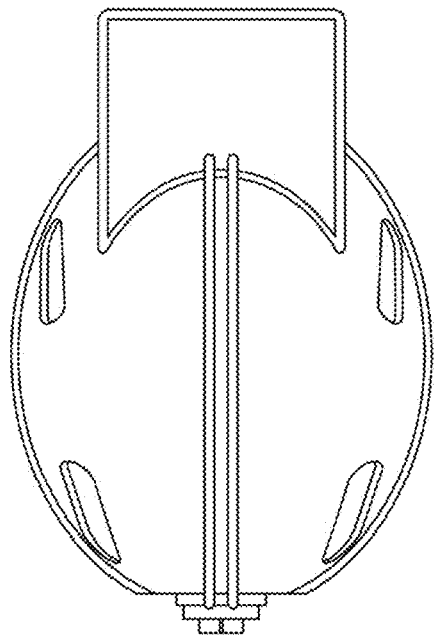
FIG. 1(a) illustrates a top view of an assistive device, according to certain embodiments.
Figure 1B:
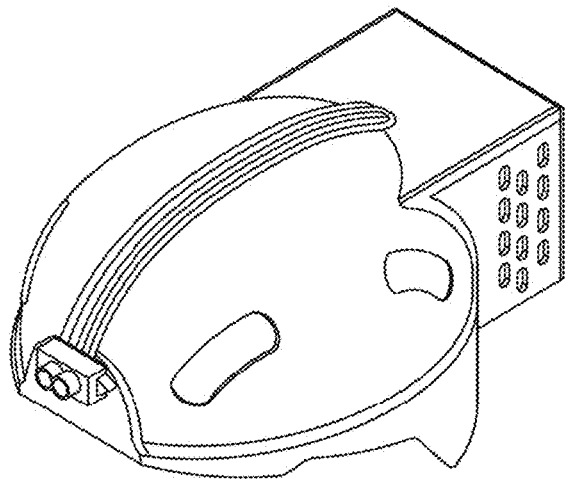
FIG. 1(b) illustrates a perspective view of the assistive device, according to certain embodiments.
Figure 1C:
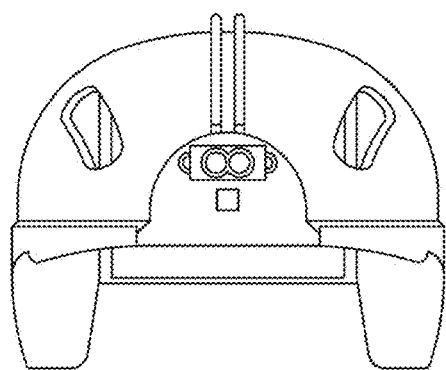
FIG. 1(c) illustrates a rear view of the assistive device, according to certain embodiments.
Figure 1D:
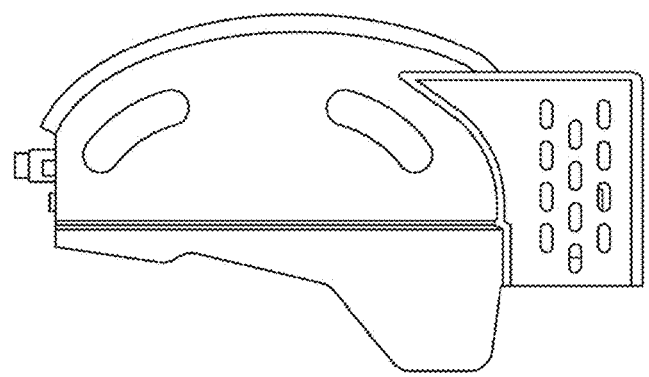
FIG. 1(d) illustrates a side view of the assistive device, according to certain embodiments.

Certain embodiments may assist people with VI in an indoor environment. For instance, certain embodiments may provide assistance to users to accomplish multiple tasks in indoor environments. FIGS. 1(a)-1(d) illustrate an assistive device from different angles, according to certain embodiments. In particular, FIG. 1(a) illustrates a top view of the assistive device, FIG. 1(b) illustrates a perspective view of the assistive device, FIG. 1(c) illustrates a rear view of the assistive device, and FIG. 1(d) illustrates a side view of the assistive device. As shown in FIGS. 1(a)-1(d), the assistive device may be incorporated in the form of a hat or helmet configured to be worn on the head of a person. However, in other embodiments, the assistive device may be incorporated into other configurations, shapes, and/or sizes.

Figure 2:
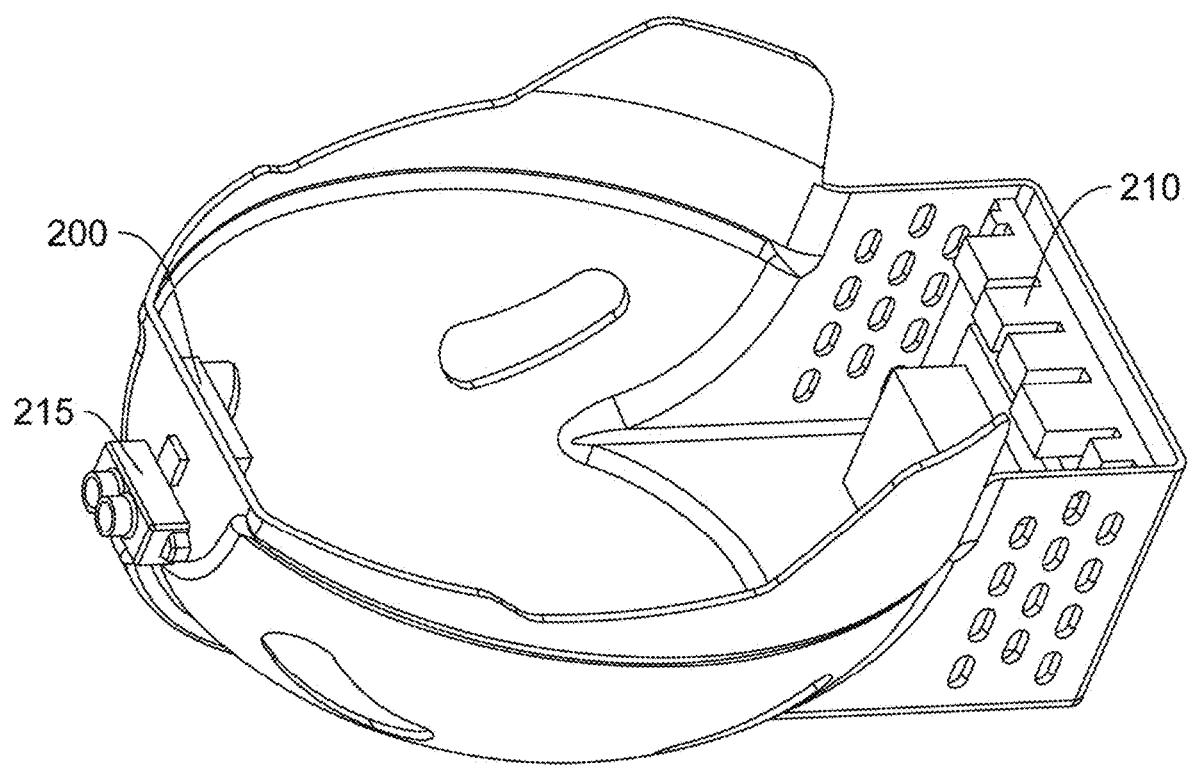
FIG. 2 illustrates a hardware design of the assistive device, according to certain embodiments.

FIG. 2 illustrates the hardware design of the assistive device, according to certain embodiments. As shown in FIG. 2, the assistive device may include a camera 200, a printed circuit board (PCB) 210, and a laser range finder implementing light detection and ranging (e.g., LiDAR) 215. In certain embodiments, the camera attached to the assistive device may be dedicated to real-time capturing of scenes in front of the user. The captured image may be sent to a single-board computer (e.g., PCB 210) attached toward the rear of the assistive device via data cables. In some embodiments, the single-board computer may include various modules to process the captured images and provide assistance to the user of the assistive device.

According to certain embodiments, the laser range finder 215 may be employed in the assistive device to ensure the safety of the user in indoor or outdoor environments. Additionally, in other embodiments, an earphone or speaker may be incorporated into the assistive device to provide assistance to the user via speech. In certain embodiments, the user may communicate with the assistive device using a microphone attached to the assistive device, and a portable power source may be included to provide power for the assistive device.

Figure 3:
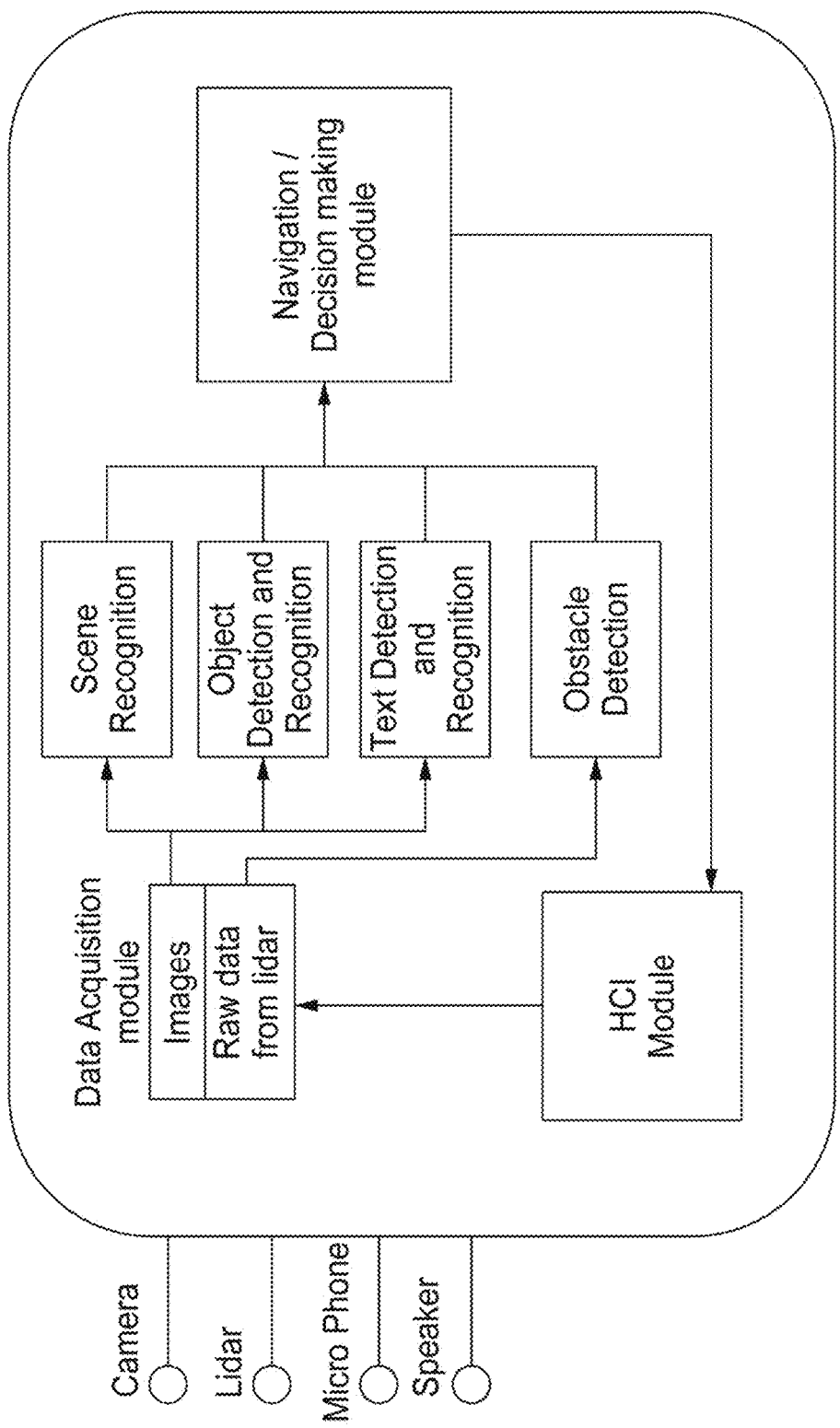
FIG. 3 illustrates an example block diagram of an assistive device system, according to certain embodiments.
Figure 4A:
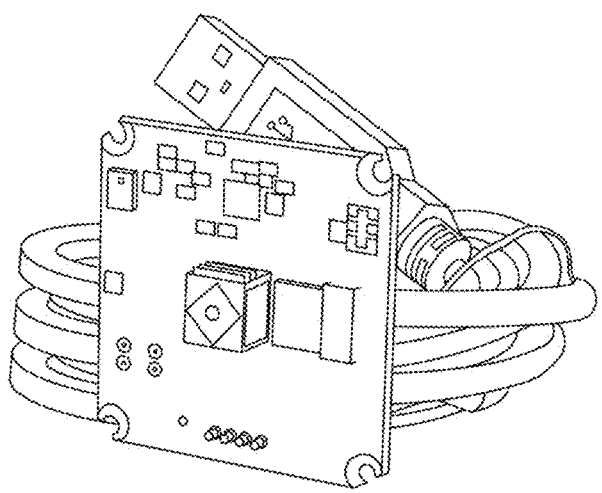
FIG. 4(a) illustrates an example camera of the assistive device system, according to certain embodiments.
Figure 4B:
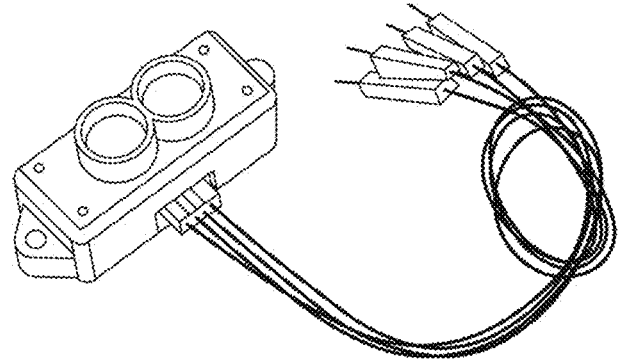
FIG. 4(b) illustrates an example laser range finder of the assistive device system, according to certain embodiments.
Figure 4C:
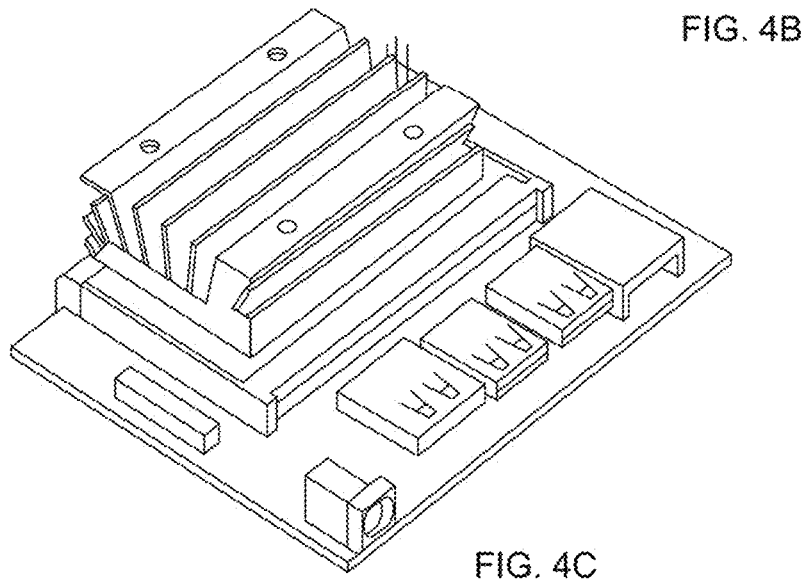
FIG. 4(c) illustrates an example single board computer of the assistive device system, according to certain embodiments.

FIG. 3 illustrates an example block diagram of an assistive device system, according to certain embodiments. Further, FIGS. 4(a)-4(c) illustrate example hardware components of the assistive device system, according to certain embodiments. For instance, as illustrated in FIG. 4(a), the assistive device system may include a camera (e.g., Raspberry Pi camera V2). Additionally, the assistive device system may include a laser range finder, and a Jetson NANO™ single board computer (see FIGS. 4(b) and 4(c), respectively). In some embodiments, the single-board computer may employ various functions including, for example, scene recognition-based navigation, object detection and recognition, and text recognition. According to certain embodiments, the scene recognition module may utilize a lite convolutional neural network (CNN) model for recognizing indoor locations. The CNN model may be trained using imageries of indoor areas which may enable the system to recognize an approximate location of the user (e.g., an approximate location of the user in a building such as which part of the building the user is located). Additionally, the navigation module may provide navigation instructions and guidance for the user to move through indoor areas. The navigation instructions may include notification of obstacles in the path of the user, and how long the obstacles are from the user. If is the obstacles are very near to the user, the system may give instructions to the user to stop and take the diversion.

In certain embodiments, the object detection and recognition module may be implemented to recognize objects and obstacles in an indoor area. For instance, in some embodiments, the objects and obstacles may include people, furniture items (e.g., chair, sofa, table, etc.), and other miscellaneous items that can be found in an indoor area (e.g., a bottle, etc.). According to certain example embodiments, machine learning such as, for example, transfer learning, may be utilized by the assistive device to develop the object and recognition module. For instance, in certain embodiments, the module may be retrained to recognize various common objects bound in indoor locations. Additionally, the obstacle detection module may make use of micro LiDAR to detect various static and dynamic, as well as classified and unclassified obstacles found in the path of the user. As such, the application of micro LiDAR may help ensure user safety. According to certain embodiments, classified objections may correspond to objects that the object detection model and identify. In other words, the classified objects may be the ones where the object detection model is trained to identify. Other objects that are not trained with object detection models may be considered unclassified objects. Further, in other embodiments, the module may be configured to detect static and dynamic objects. In some embodiments, obstacles and objects may be similar. However, objects may be mentioned when referring to the object detection model that can recognize the object name (i.e., whether it is a chair, table, etc.). LiDAR, however, may not be able to detect the name of the object. Instead, LiDAR may just detect whether the object exists or not in the path of the user so that in context, it may be considered as obstacles.

According to certain embodiments, the text recognition module may enable the system of the assistive device to read out texts in captured images, and thereby provide more perception to the user about the surrounding environment. For instance, in certain embodiments, the text recognition module may implement end-to-end text recognition functions, which may include text detection and text recognition. According to certain embodiments, text detection may refer to a technique where an image may be given to the model and the textual region may be detected by plotting a bounding box around it. After text detection comes text recognition where the detected textual regions may be further processed in order to recognize what the text is. In certain embodiments, there may be many different methods for performing text detection. Here, a traditional method, namely, Maximally Stable Extremal Regions (MSER) may be used. The natural scene in which the text must be detected is given as the input. The natural image is subjected to a series of changes such as grey scaling, thresholding and passing it through Sobel filters. The enhanced image may then be passed through morphological execution along with getting the structural elements to make it easier for finding the contours. The textual regions are found using the contour area and a bounding box may be given with the x1, y1, and x2, y2 location of the text region. After detecting the text regions, the bounding box co-ordinates are used to extract the text alone from the natural scene. The extracted text regions may be given as input to the text recognition module to recognize it. According to certain embodiments, a deep learning-based model may be implemented to perform text recognition. Text recognition may be implemented using a novel deep convolutional neural network architecture, and the architecture may be built by stacking convolutional, pooling and dense layers with different filter sizes and the number of filters. In some embodiments, the dataset used for training and validating the model built may be collected from Qatar University and consists of natural images from around the campus and doors. The dataset may include natural images with different angles, illuminations, and points of view to help the model in generalizing better. According to certain embodiments, text detection may be performed where the detection of the textual parts in natural scenery is involved, and traditional methods for detecting the text in the natural scene may be executed. Some examples of traditional methods used for text detection may include Connected Component Analysis (CCA) and Sliding window classification methods which are used to detect the text character wise. Additionally, some of the word-based text detection methods may include Bounding box regression based method, segmentation based method or combination of both methods.

In some embodiments, the natural image may be subjected to a series of changes such as grey scaling, thresholding, and passing it through Sobel filters. The enhanced image may then be passed through morphological execution along with getting the structural elements to make it easier for finding the contours. Further, in some embodiments, the textual regions may be found using the contour area, and a bounding box may be given with the x1, y1, and x2, y2 location of the text region. According to certain embodiments, contours may be defined as the curve joining all the continuous points (along the boundary), having same color or intensity. Contours may be used in determining the shapes in object detection task. In certain embodiments, OpenCV python library may have the function to determine all the contours in any natural scene. Additionally, texts in images may have distinct textural properties that can be used to discriminate them from the background or other non-text region. In some embodiments, contours may be used to find a distinguish white object from a black background. In this case, the contours may be the text regions in the natural scene.

According to certain embodiments, text recognition may be implemented using a deep CNN architecture. The architecture may be built by stacking convolutional, pooling, and dense layers with different filter sizes and the number of filters. The dataset may be used for training and validating the model built may be collected, and may include natural images from around the indoor environment. In other embodiments, the dataset may include natural images with different angles, illuminations, and points of view to help the model for better generalization. For instance, in certain embodiments, the images captured for the dataset may have natural scene images that contain text. To add variety to the captured image, the angle of the image capture, illumination level, and the point of view of the image capture may be varied.

As illustrated in FIG. 3, the assistive device system may include a human-computer interaction (HCI) module, which enables the user to communicate with the assistive device via a microphone. According to certain embodiments, the user may control the functions of the assistive device using verbal instructions. According to certain embodiments, the control functions that the user can initiate via verbal instructions include turning off or turning on certain functions alone. The user may also have the ability to turn on or turn off, pause or resume object recognition or text recognition, or indoor scene recognition alone according to his requirements using verbal instructions. According to other embodiments, an open-source speech to text module may be employed for recognizing and processing the speech of the user. Additionally, certain embodiments of the assistive device system may provide navigation and other instructions to the user via speech. In other embodiments, the assistive device system may speak out instructions to the user.

In certain embodiments, the assistive device (including the camera, obstacle detection sensor, and central processing unit) may have a total weight of about 437 grams. In other embodiments, the portable power source (i.e., power bank) may be about 300 grams, and may be used for providing power to the assistive device. Furthermore, according to certain embodiments, the power bank may be kept in a separate pouch attached to the user such as, for example, attached to the waist or shoulder.

FIGS. 5(a)-5(d) illustrate evaluation results of the assistive device, according to certain embodiments. In certain embodiments, a vision-based indoor scene recognition task may employ a pattern recognition procedure to compare the query images with images stored in the database to estimate the current location of the user. In particular, certain embodiments may use orientated fast and rotated brief (ORB) and scale invariant feature transform (SIFT), and the usage of Multi-Scale Local Binary Pattern (MSLBP) for recognizing the indoor scenes. Moreover, certain embodiments may employ a CNN based architecture for indoor scene recognition tasks. According to certain embodiments, MSLBP feature descriptor may be used for indoor scene recognition. MSLBP features may be used for various tasks such as face recognition, fingerprint liveness detection, etc., but has not been applied for indoor scene recognition task. In other embodiments, the MSLBP features may be integrated with SIFT or ORB features to improve the scene recognition accuracy. Additionally, in certain embodiments, a lite CNN model for indoor scene recognition task(s) may be developed and utilized.

Certain example embodiments described herein may be evaluated in an indoor scene recognition dataset collected from an indoor premises of a building. For instance, FIG. 5(a) illustrates example sample images from an indoor dataset, according to certain embodiments.

Figure 5A:
FIG. 5(a) illustrates example sample images from an indoor dataset, according to certain embodiments, according to certain embodiments.

The dataset illustrated in FIG. 5(a) may be composed of a set of directories in which each represents one indoor location, and each directory may represent one class. Furthermore, each class may include about 100 pictures along with one information file (info.json) and 40 pictures dedicated for testing purposes. According to certain embodiments, to preserve the different orientation of users, pictures were collected from different angles for the same places. Additionally, pictures were taken from diversified types of mobile devices. The diversity of mobile phones may be considered to reserve the different sorts of pictures that are taken from varied cameras. The size of the images may be stored in the dataset is 224 pixels in height and width.

The evaluation results of the algorithms and existing algorithms on the indoor image dataset are displayed in Table 1. SVM classifiers are used to evaluate the SIFT, ORB and MSLBP image descriptors.

TABLE 1

Performance of proposed and existing algorithms evaluated in the indoor dataset

| Methods | Accuracy (%) |
|---|---|
| MSLBP | 91.27 |
| ORB | 96.33 |
| SIFT | 88.19 |
| SIFT-MSLBP | 93.55 |
| ORB-MSLBP | 97.52 |
| Lite CNN | 97.92 |
| GoogleNet | 71.61 |

The methods displayed in the bold fonts are the ones according to certain embodiments, and rest are conventional methods. It is clear from the table that the lite CNN model of certain embodiments has produced outcomes that exceed all other methods for indoor scene recognition tasks and achieved a maximum scene recognition accuracy of 97.92%. Among traditional features descriptor-based methods, the ORB feature descriptor produced better recognition accuracy. The feature descriptor integration approach according to certain embodiments has improved the scene recognition accuracy of the ORB feature descriptor. Additionally, in certain embodiments, the ORB feature descriptor may be integrated with the MSLBP feature. This approach produced more than a 1% increment in the scene recognition accuracy. Certain embodiments also utilized a GoogleNet model pre-trained in the 'Places365' dataset to evaluate in the dataset. The obtained result is so far not convincing for indoor scene recognition task. Compared to GoogleNet architecture the light CNN model of certain embodiments has very few CNN layers (7 CNN layers), but it produced the maximum accuracy among all other methods. Thus, certain embodiments have been proven to provide the effectiveness of the lite CNN model. In particular, certain embodiments utilized this light CNN model in the single-board computer for recognizing the indoor scenes in real-time and thereby providing the navigation assistance to people with visual impairments.

Certain example embodiments may also provide end to end text recognition, which may involve two steps—text detection and text recognition is implemented. Text detection is a step performed where the detection of the textual parts in natural scenery is involved. Traditional methods for detecting the text in the natural scene may be executed. The natural image may be subjected to a series of changes like grey scaling, thresholding and passing it through Sobel filters. The enhanced image may then be passed through morphological execution along with getting the structural elements to make it easier for finding the contours. The textual regions may be found using the contour area and a bounding box is given with the x1, y1, and x2, y2 location of the text region. The x1, y1, and x2, y2 location of the text region given by the text detection method may then passed through the recognition model for identifying the written text.

According to certain embodiments, text recognition may be implemented using a deep CNN architecture. The architecture may be built by stacking convolutional, pooling and dense layers with different filter sizes and the number of filters. Recurrent Neural Networks (RNN) may be a type of CNN used in datasets dealing with a sequence like the time series. In a time series, every item in the series is related to each other. RNN remembers the data it has learned in the past during training. With this knowledge of the past, it tries to decide on the incoming data. Another added advantage is that there is no need for explicit segmentation. One such, deep RNN architecture is used for text recognition where the word is divided into letter segments. Later, the letter segments are classified into one of the class labels. According to certain embodiments, the architecture used for text recognition may have a VGG-16 based deep CNN which is then followed by two bi-directional RNN layers. The number of filters used in the LSTMBi-directional RNN layers are 128. SGD optimizer is used. A Spatial Transformer Network (STN) may be used to transform the feature maps obtained from the base CNN to the bi-directional LSTM layers, and the STN layer may use a localization network to segment the letters from the word segments. The possible classes may include 26 alphabets from a to z, numbers from 0 to 9, and the predictions given by the model may be compared against a lexicon to reduce the number of false positives. Lexicons are a dictionary against which the predictions are looked upon, and the standard 50 k-words Hunspell spell-checking dictionary may be used as lexicon.

Figure 5B:
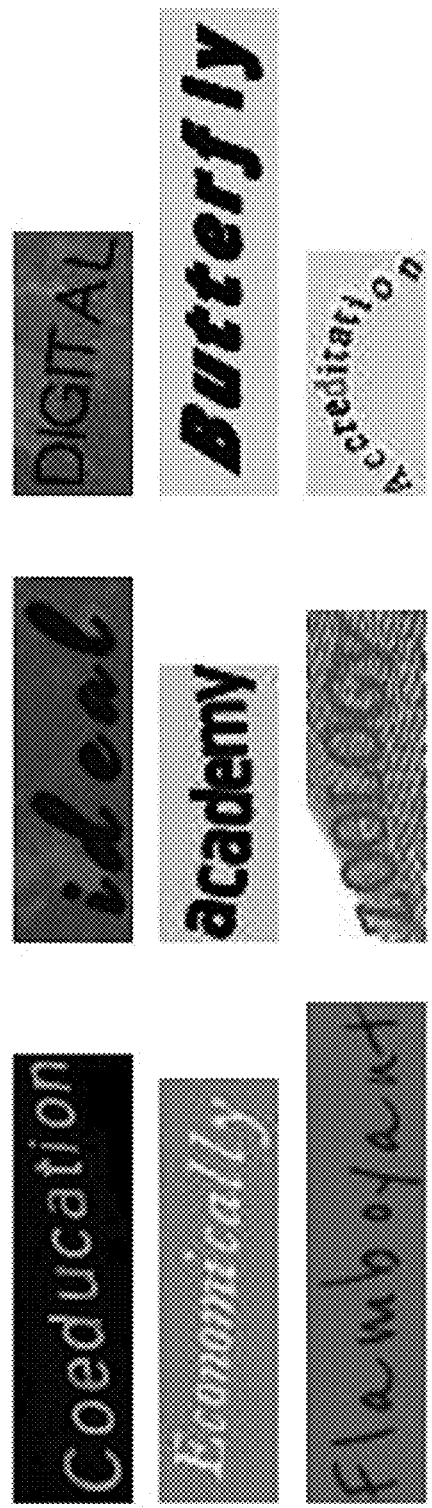
FIG. 5(b) illustrates example images with different illumination, angle, and curvatures from the dataset used, according to certain embodiments.

According to certain embodiments, a dataset used for training and validating the model built may include natural images from around an educational campus and doors. The dataset may include natural images with different angles, illuminations, and points of view to help the model in generalizing better. However, the collected dataset may be small and it may not fully cover all the common words used. To overcome this, in certain embodiments, 3000 common-words from a synthetic dataset may be used along with the images collected for better performance. The images in the dataset may include grayscale images with different image sizes. FIG. 5(b) illustrates example images with different illumination, angle, and curvatures from the dataset used, according to certain embodiments.

Figure 5C:
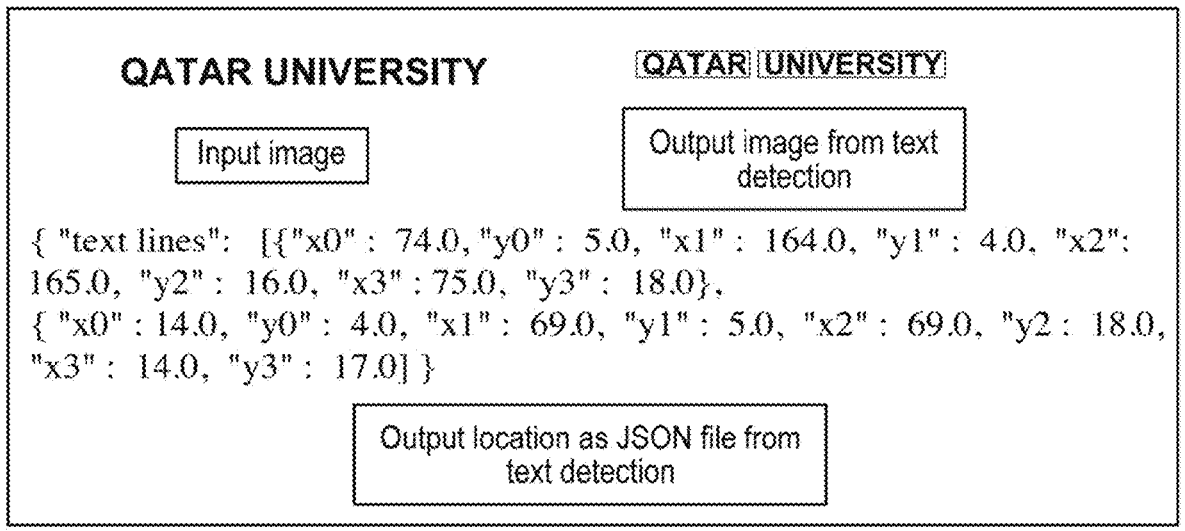
FIG. 5(c) illustrates results of text detection, according to certain embodiments.
Figure 5D:
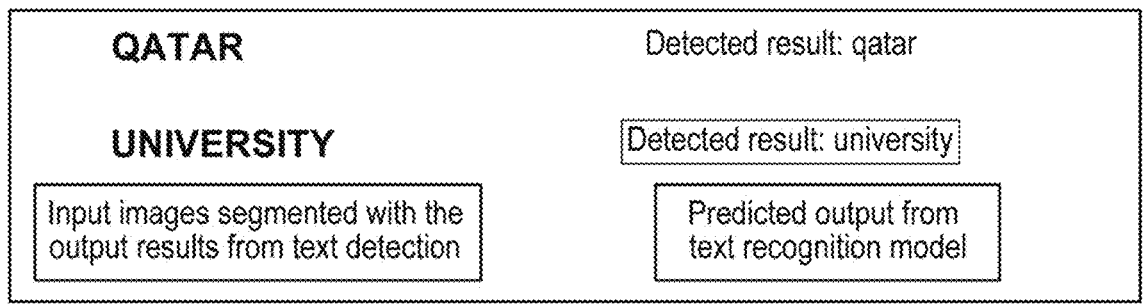
FIG. 5(d) illustrates results of text recognition for given word segments, according to certain embodiments.

In certain embodiments, the whole dataset consisting of 3750 words may be divided into training and testing in the ratio of 80:20. The training dataset may further be divided into a validation split of 80:20. The experiments may be conducted on a computer laptop with a single GPU. In some embodiments, accuracy may be used to evaluate the performance of the model. For instance, accuracy may be given by the ratio of the number of correct predictions made by the model to the total number of correct predictions possible. According to certain embodiments, the accuracy of the model on the testing dataset may be 95.83%. Additionally, the overall time, taken for text detection and text recognition may be 0.08 seconds. For text detection, it took 0.06 seconds and 0.02 seconds for text recognition. FIGS. 5(c) and 5(d) illustrate the results of text detection and text recognition on the word segments from the text detection method for a sample image.

Unlike image recognition or classification, multiple object recognition is a challenging and hefty task in the computer vision. An object detection model should be able to do both classification and localization. Classification refers to identifying the class of the object present in the current frame. On the other hand, localization refers to identifying the coordinates of the object or position of the objects in the current frame. Compared to classification, localization may utilize complex computations to compute the coordinates of the detected object in a given frame. While choosing an algorithm certain embodiments may consider both their speed and accuracy. When it comes to object detection, the implementation of object detection in a single board computer may be challenging since such implementation may have limited memory and minimal GPU resources. Thus, certain embodiments analyze various object detection algorithms and test their performance in the MS COCO object detection dataset. Table 2 provides the performance of various object detection algorithms, according to certain embodiments.

TABLE 2

Performance of object detection algorithms evaluated in the COCO test dataset

| Algorithm | Mean Average Precision | Frame Per Seconds (FPS) |
| --- | --- | --- |
| Faster R-CNN | 42.1 | 5 |
| SSD 300 | 23.2 | 59 |
| YOLO | 33 | 40 |

It is clear from Table 2 that Faster R-CNN outperformed the other two methods in terms of mean average precision. However, FPS is very low for Faster R-CNN. Moreover, these results are generated in a computer with an NVIDIA Tesla K40 GPU. It means Faster R-CNN is an expensive object detection algorithm, and Faster R-CNN cannot be executed in a device such as Nvidia Jetson since it has a very low GPU and RAM. The performance of three object detection algorithms in the Nvidia Jetson Nano device is shown in Table 3.

TABLE 3

Frame per seconds of object detection algorithms in Jetson Nano

| Algorithm | Average Frame Per Seconds (FPS) |
| --- | --- |
| Faster R-CNN | DNR |
| SSD 300 + MobileNet V2 | 20 |
| YOLO | 3.5 |

As shown in Table 3, Faster R-CNN is not able to run in the Jetson Nano because of memory issues. SSD algorithm is more efficient than the other two algorithms and achieved and FPS of 20. In the case of SSD, different combinations of SSD algorithms were used with different CNN network as their backbone feature extraction network. SSD 300 means it will take an input image of size 300 pixels×300 pixels. Different input sizes (480×272 pixels, 960×544) were used, but SSD 300 produced better FPS. Moreover, MobilNet CNNs were used for feature extraction, since it is quicker than other popular CNNs such as ResNet, GoogleNet, etc. YOLO algorithm is not fast enough to implement in the Jetson Nano device for a real-time application since it can process only 3-4 frames in a second. While considering the tradeoff between accuracy and speed, the SSD algorithm is more preferable for a single board computer device like Jetson Nano. In system of certain embodiments, SSD-MobileNet version 2 CNN model may be employed for realtime object detection applications.

Figure 6:
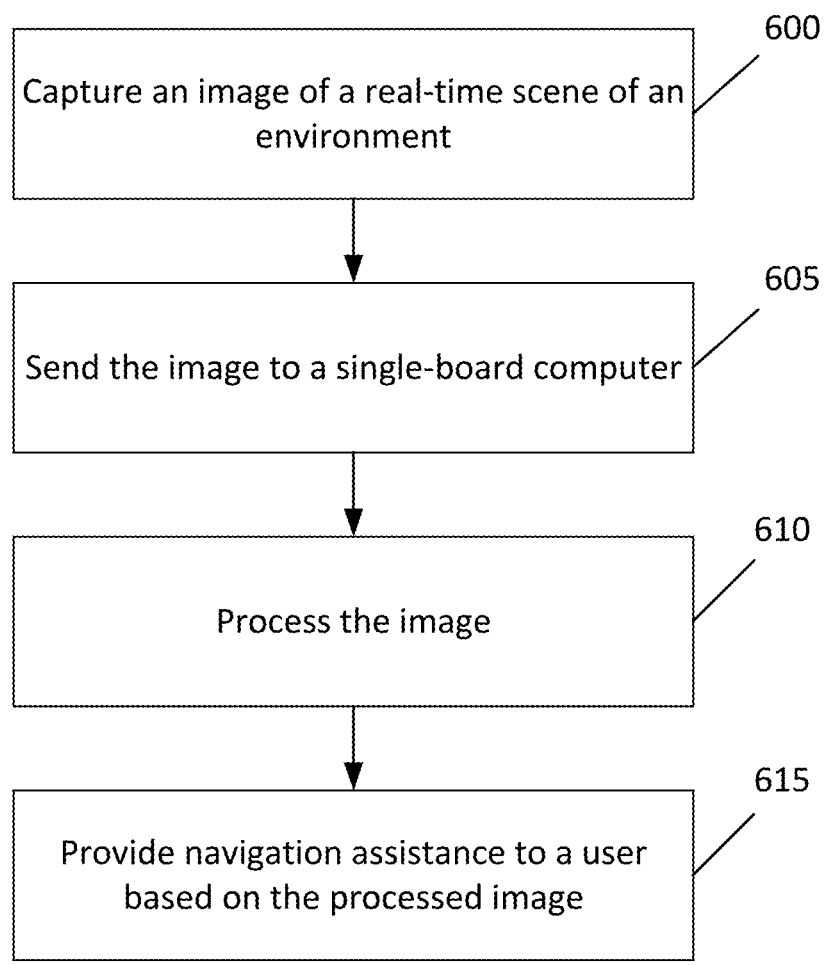
FIG. 6 illustrates a flow diagram of a method, according to certain embodiments.

FIG. 6 illustrates a flow diagram of a method, according to certain embodiments. In certain embodiments, the flow diagram of FIG. 6 may be performed by a computing device, for instance, a computing device for assisting people with VI in an environment (e.g., indoor environment), similar to apparatus 10 illustrated in FIG. 7.

According to one embodiment, the method of FIG. 6 may include, at 600, capturing an image of a real-time scene of an environment. The method may also includes, at 605, sending the image to a single-board computer. The method may further include, at 610, processing the image. Additionally, the method may include, at 615, providing navigation assistance to a user based on the processed image. According to certain example embodiments, the processing of the image may include at least one of recognizing a location of the user in the environment, recognizing or detecting an object in the environment, detecting static or dynamic obstacles in the environment, and performing an end-to-end text recognition of the image.

In certain embodiments, recognition of the location of the user in the environment may include utilizing a lite convolutional neural network model configured to recognize the environment. In some embodiments, recognition or detection of the of the object in the environment may include employing machine-learning trained to identify objects and obstacles found in the environment. In other embodiments, detection of the static or dynamic obstacles in the environment may include using a micro light detection and ranging method.

According to certain embodiments, performance of the end-to-end text recognition may include implementing text detection and text recognition. According to some embodiments, the navigation assistance may be provided via speech instructions.

Figure 7:
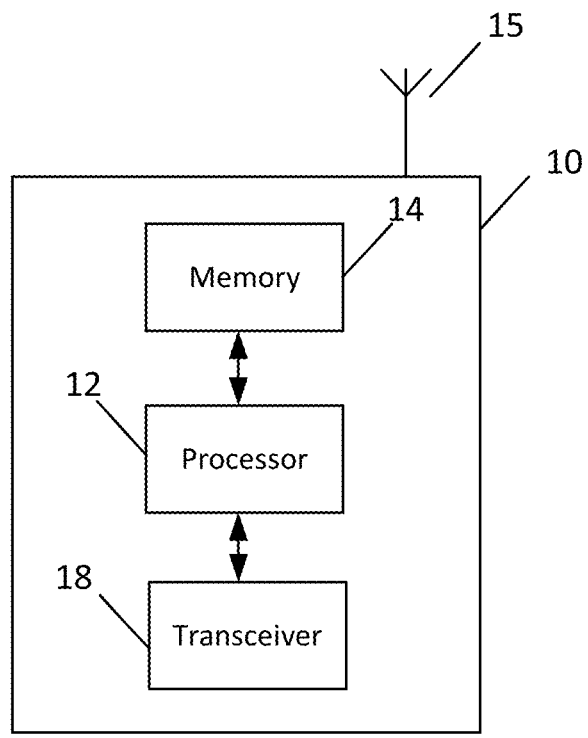
FIG. 7 illustrates an apparatus, according to certain embodiments.

FIG. 7 illustrates an apparatus according to certain embodiments. According to certain embodiments, apparatus 10 may be a computing device including, for example, a single-board computer (e.g., PCB). As described herein, a computing device may alternatively be referred to as, for example, a computer, hardware device, mobile device, or the like.

In some example embodiments, apparatus 10 may include one or more processors, one or more computer-readable storage medium (for example, memory, storage, or the like), and/or a user interface. It should be noted that one of ordinary skill in the art would understand that apparatus 10 may include components or features not shown in FIG. 7.

As illustrated in the example of FIG. 7, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7, multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-6.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-6.

In some embodiments, apparatus 10 may also include or be coupled to one or more antennas 15 for receiving a signal and for transmitting from apparatus 10. Apparatus 10 may further include a transceiver 18 configured to transmit and receive information. For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with other hardware elements described herein via a wireless or wired communications link.

According to certain example embodiments, processor 12 and memory 14 may be included in or may form a part of processing circuitry or control circuitry. In addition, in some embodiments, transceiver 18 may be included in or may form a part of transceiving circuitry. As discussed above, according to certain example embodiments, apparatus 10 may be a controller for example. According to certain embodiments, apparatus 10 may be controlled by memory 14 and processor 12 to perform the functions associated with example embodiments described herein. For instance, in one embodiment, apparatus 10 may be controlled by memory 14 and processor 12 to capture an image of a real-time scene of an environment. Apparatus 10 may also be controlled by memory 14 and processor 12 to send the image to a single-board computer. Apparatus 10 may further be controlled by memory 14 and processor 12 to process the image. In addition, apparatus 10 may be controlled by memory 14 and processor 12 to provide navigation assistance to a user based on the processed image. According to certain embodiments, processing the image may include at least one of recognizing a location of the user in the environment, recognizing or detecting an object in the environment, detecting static or dynamic obstacles in the environment, and performing an end-to-end text recognition of the image.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for capturing an image of a real-time scene of an environment. The apparatus may also include means for sending the image to a single-board computer. The apparatus may further include means for processing the image. In addition, the apparatus may include means for providing navigation assistance to a user based on the processed image. According to certain embodiments, the processing of the image may include at least one of recognizing a location of the user in the environment, recognizing or detecting an object in the environment, detecting static or dynamic obstacles in the environment, and performing an end-to-end text recognition of the image.

Certain embodiments described herein provide several technical improvements, enhancements, and/or advantages. Although there are assistive systems developed for people with VI, most of these systems are developed for a single purpose such as either navigation or object recognition or text recognition. Few systems provide assistance to people with VI to accomplish different tasks. They are also not good enough indoor areas.

Further, the specific structure of the helmet of certain embodiments differs from existing systems. While compared to existing systems, the helmet design and multiple functionalities included in the system of certain embodiments provide distinct advantages over existing systems. Additionally many existing systems have been developed in a client-server manner, where as the system of certain embodiments does not require any server to process the information. Instead, the processing may be carried out in the single board computer attached to the hat. This design enables the system to provide real-time assistance for people with visual impairments.

In this context, some embodiments may provide assistance to people with VI to accomplish multiple jobs or tasks in indoor areas. According to certain embodiments, it may also be possible to provide an assistive device that is light and powerful since the system does not require any Internet or data connection to function. Additionally, in other embodiments, the assistive device system may work in a real-time manner. To achieve real-time performance, the processor may be embedded in the device. Further, in some embodiments, the processor may be powerful enough to carry out various machine-learning functions in a real-time manner.

Other embodiments may provide assistance for people with VI for navigation, object recognition, and text recognition in indoor areas. Unlike conventional systems, certain embodiments may use a small and lightweight RGB camera to capture the scenes in front of the users. Such a power single-board computer may be utilized to process the captured images as well as the output from the laser range finder. In doing so, it may be possible to improve the system's efficiency, and provide assistance in a real-time manner.

In further embodiments, the scene recognition and text recognition deep learning models may be implemented in the system. The object recognition, scene recognition, and text recognition models may be trained with a sufficiently large dataset while not requiring any server to process the information. instead, according to certain embodiments, the processing may be carried out in the single board computer attached to the hat. This design enables the system to provide real-time assistance for people with VI.

Additionally, certain embodiments may provide aid to people with visual impairments to walk in the indoor environment with minimal external support. Moreover, people with visual impairments can use this system to recognize the commonly used objects such as mobile, laptops, chairs, tables, packet foods, etc. The system may also enable the visually impaired user to read the texts in documents, posters and name boards. In addition, the system can detect the obstacle that hinders the movement of the users and ensures their safety.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments.

We claim:

1. A method for operating a mobile assistive device, comprising:
   capturing an image of a real-time scene of an environment;
   sending the image to a single-board computer;
   processing the image;
   providing navigation assistance to a user based on the processed image,
   wherein the processing of the image comprises at least one of recognizing a location of the user in the environment, recognizing or detecting an object in the environment, detecting static or dynamic obstacles in the environment, and performing an end-to-end text recognition of the image,
   wherein performance of the end-to-end text recognition comprises
      implementing text detection and text recognition, and
      implementing a recurrent neural network by stacking convolutional, pooling and dense layers with different filter sizes and different number of filters; and
   controlling the recognition or detection of the object, and the performance of the end-to-end text recognition of the image via verbal instructions from the user, wherein the controlling comprises turning on or off, and pausing or resuming the object recognition or detection and the end-to-end text recognition of the image.

2. The method for operating the mobile assistive device according to claim 1, wherein recognition of the location of the user in the environment comprises utilizing a lite convolutional neural network model configured to recognize the environment.

3. The method for operating the mobile assistive device according to claim 1, wherein recognition or detection of the of the object in the environment comprises employing machine-learning trained to identify objects and obstacles found in the environment.

4. The method for operating the mobile assistive device according to claim 1, wherein detection of the static or dynamic obstacles in the environment comprises using a micro light detection and ranging method.

5. The method for operating the mobile assistive device according to claim 1, wherein the navigation assistance is provided via speech instructions.

6. A mobile assistive device, comprising:
   at least one processor; and
   at least one memory including computer program code,
   wherein the at least one memory and the computer program code are configured to, with the at least one processor, cause a controller of the mobile assistive device at least to:
   capture an image of a real-time scene of an environment;
   send the image to a single-board computer;
   process the image;
   provide navigation assistance to a user based on the processed image,
   wherein processing the image comprises at least one of recognizing a location of the user in the environment, recognizing or detecting an object in the environment, detecting static or dynamic obstacles in the environment, and performing an end-to-end text recognition of the image,
   wherein performance of the end-to-end text recognition comprises
      implementing text detection and text recognition, and
      implementing a recurrent neural network by stacking convolutional, pooling and dense layers with different filter sizes and different number of filters; and
   control the recognition or detection of the object, and the performance of the end-to-end text recognition of the image via verbal instructions from the user, wherein the control comprises turning on or off, and pausing or resuming the object recognition or detection and the end-to-end text recognition of the image.

7. The mobile assistive device according to claim 6, wherein when recognizing the location of the user in the environment, the at least one memory and the computer program code are further configured to, with the at least one processor, cause the controller at least to:
   utilize a lite convolutional neural network model configured to recognize the environment.

8. The mobile assistive device according to claim 6, wherein when recognizing or detecting the object in the environment, the at least one memory and the computer program code are further configured to, with the at least one processor, cause the controller at least to:
   employ machine-learning trained to identify objects and obstacles found in the environment.

9. The mobile assistive device according to claim 6, wherein when detecting the static or dynamic obstacles in the environment, the at least one memory and the computer program code are further configured to, with the at least one processor, cause the controller at least to:
    execute a micro light detection and ranging method.

10. The mobile assistive device according to claim 6, wherein the navigation assistance is provided via speech instructions.

11. A non-transitory computer readable medium, with a computer program encoded thereon, the computer program, when executed by a processor, causes the processor to:
    capture an image of a real-time scene of an environment;
    send the image to a single-board computer;
    process the image;
    provide navigation assistance to a user based on the processed image,
    wherein processing the image comprises at least one of recognizing a location of the user in the environment, recognizing or detecting an object in the environment, detecting static or dynamic obstacles in the environment, and performing an end-to-end text recognition of the image,
    wherein performance of the end-to-end text recognition comprises
        implementing text detection and text recognition, and
        implementing a recurrent neural network by stacking convolutional, pooling and dense layers with different filter sizes and different number of filters; and
    control the recognition or detection of the object, and the performance of the end-to-end text recognition of the image via verbal instructions from the user, wherein the control comprises turning on or off, and pausing or resuming the object recognition or detection and the end-to-end text recognition of the image.

12. The non-transitory computer readable medium according to claim 11, wherein when recognizing the location of the user in the environment, the processor is further caused to:
    utilize a lite convolutional neural network model configured to recognize the environment.

13. The non-transitory computer readable medium according to claim 11, wherein when recognizing or detecting the object in the environment, the processor is further caused to:
    employ machine-learning trained to identify objects and obstacles found in the environment.

14. The non-transitory computer readable medium according to claim 11, wherein when detecting the static or dynamic obstacles in the environment, the processor is further caused to:
    execute a micro light detection and ranging method.

15. The non-transitory computer readable medium according to claim 11, wherein the navigation assistance is provided via speech instructions.

\* \* \* \* \*